United States Patent [19]

Lamonica et al.

[11] Patent Number: 5,016,386
[45] Date of Patent: May 21, 1991

[54] ROTATABLE BLADE FOR FISHING LURE

[76] Inventors: Daryle Lamonica, 8796 N. Sixth St.;
Wayne V. Tatti, 8497 N. Millbrook,
both of Fresno, Calif. 93710

[21] Appl. No.: 511,274

[22] Filed: Apr. 23, 1990

[51] Int. Cl.$^5$ .............................................. A01K 85/00
[52] U.S. Cl. .................................. 43/42.14; 43/42.17;
43/42.19
[58] Field of Search ................ 43/42.12, 42.14, 42.15,
43/42.16, 42.17, 42.18, 42.19

[56] References Cited

U.S. PATENT DOCUMENTS

| 167,784 | 9/1875 | Pierce | 43/42.14 |
| 771,116 | 9/1904 | Barnhart | 43/42.14 |
| 1,353,779 | 9/1920 | Moore | 43/42.19 |
| 1,558,249 | 10/1923 | De Zeng | 43/42.14 |
| 1,989,460 | 5/1933 | Porter | 43/42.17 |
| 3,858,343 | 1/1975 | Goforth | 43/42.17 |

FOREIGN PATENT DOCUMENTS 745408  2/1956  United Kingdom ............... 43/42.17

Primary Examiner—Kurt Rowan
Attorney, Agent, or Firm—Mark D. Miller

[57] ABSTRACT

A blade-and-bearing assembly for use on a fishing line or lure which includes a modified teardrop shaped blade to which a bearing is attached on the interior surface near the teardrop point so that the bearing-and-blade may rotate freely around a fishing lure shaft or fishing line. The angles of attachment of the bearing to the blade, as well as the shape of the blade itself are specially designed to impart maximum rotation creating a vibrating sound that is attractive to fish with a minimum or potential entanglement with vegetation in water. One embodiment includes the blade-and-bearing assembly as part of a lure having weight forward of the blade so that it always flows in the same direction through the water in order to entice fish into striking the lure.

11 Claims, 5 Drawing Sheets

ROTATABLE BLADE FOR FISHING LURE

BACKGROUND OF THE INVENTION

1. Field of the Invention

The present invention relates to artificial fishing lures, and more particularly refers to a novel rotatable blade assembly for use on a fishing lure.

2. Description of Related Art

Numerous fishing lures have been developed over the years as part of man's continued efforts to outsmart fish into mistaking an artificial lure for live bait. Many of the artificial lures known in the art rely upon shiny moving surfaces which reflect light and are therefore visually attractive to the eye of a fish. Many other artificial lures are designed to closely resemble known insects or other live bait. However, very few artificial lures rely on the attractiveness of the particular sound the lure generates as it passes through the water.

One of the more common varieties of artificial lures includes a rotatable blade which is attached to the lure so that it spins as the lure passes through the water. Several U.S. patents have been granted on fishing lures including rotatable propeller-type blades, among these are Wright U.S. Pat. No. 1,758,344; Trester U.S. Pat. No. 3,494,063; and Bassett U.S. Pat. No. 4,447,980. Another lure which utilizes reflected light is described in De Zeng 1,558,249.

Many desirable varieties of fish may often be found lurking in shallow water amid a tangle of tree stumps, seaweed, plants, and other materials. These treacherous regions of water are hazardous for most common fishing lures since the probability of entanglement (and subsequent loss of both fish and lure) is extremely great. This is especially true of the "spinner-like" lures which have a rotatable blade mounted thereon.

SUMMARY OF THE INVENTION

The most important object of the present invention is to provide a lure having a rotatable blade assembly that is specially designed to create a special low level turbulence as it passes through the water which is detectible and attractive to fish.

Another important object of the present invention is to provide a rotatable blade assembly for use on a fishing lure that is designed in such a way that it avoids entanglement as it passes through areas of water congested by vegetation and other materials.

It is also an important object of the present invention to provide a "weight forward" rotatable blade assembly for a fishing lure which is specially designed so that it rotates not only as the fisherman reels the lure back in, but also as the lure falls through the water following the fisherman's initial cast.

It is also an object of this invention to provide a rotatable blade for a fishing lure which catches and reflects light in a pattern attractive to fish.

According to the invention, a rotatable blade for a fishing lure is provided which includes an elongated bearing to which the blade is attached at one end. The angle of attachment of the blade to the top of the bearing is extremely critical, as is the shape of the bowl of the blade, as well as the surface area of the blade in relation to its length. Because of the unique combination of the shape of the blade in conjunction with the angles of attachment of the blade to the bearing, the invention is capable of generating attractive low level turbulence as it passes through the water, even at very slow speeds.

A bead or other thrust bearing is placed on the lure or fishing line just above the front of the bearing. This bead works in conjunction with the specially designed bearing-and-blade assembly to avoid the possibility of entanglement in vegetation or other material as the invention passes through the water. The angles of the bearing in relation to the blade are designed to cause maximum rotation, with minimum possibility for entanglement.

One embodiment of the invention includes the rotatable blade assembly attached to a lure having more weight forward of the blade assembly (toward the fisherman) than behind it (toward the hook). When this embodiment of the lure is cast by the fisherman, after impact with the water, the weight pulls the lure down in such a way that the weight is below the blade, so that the blade rotates as it passes through the water. Because the weight is part of the lure itself, and not engaged on the fishing line, it will always pull the lure down in the same way. This configuration (FIGS. 3 and 7) avoids backward rotation of the blade which might result in entanglement, and instead allows a tangle-free fall through the water before the fisherman begins to reel it in. Once the reeling is commenced, of course, the lure and blade assembly rotate according to design, following the fishing line, and avoiding entanglement.

DESCRIPTION OF THE PREFERRED EMBODIMENTS

No attempt is made to show structural details of the invention in more detail than is necessary for a fundamental understanding of the invention. The description taken with the drawings making apparent to those skilled in the art how several forms of the invention may be embodied in practice.

Figure 1:
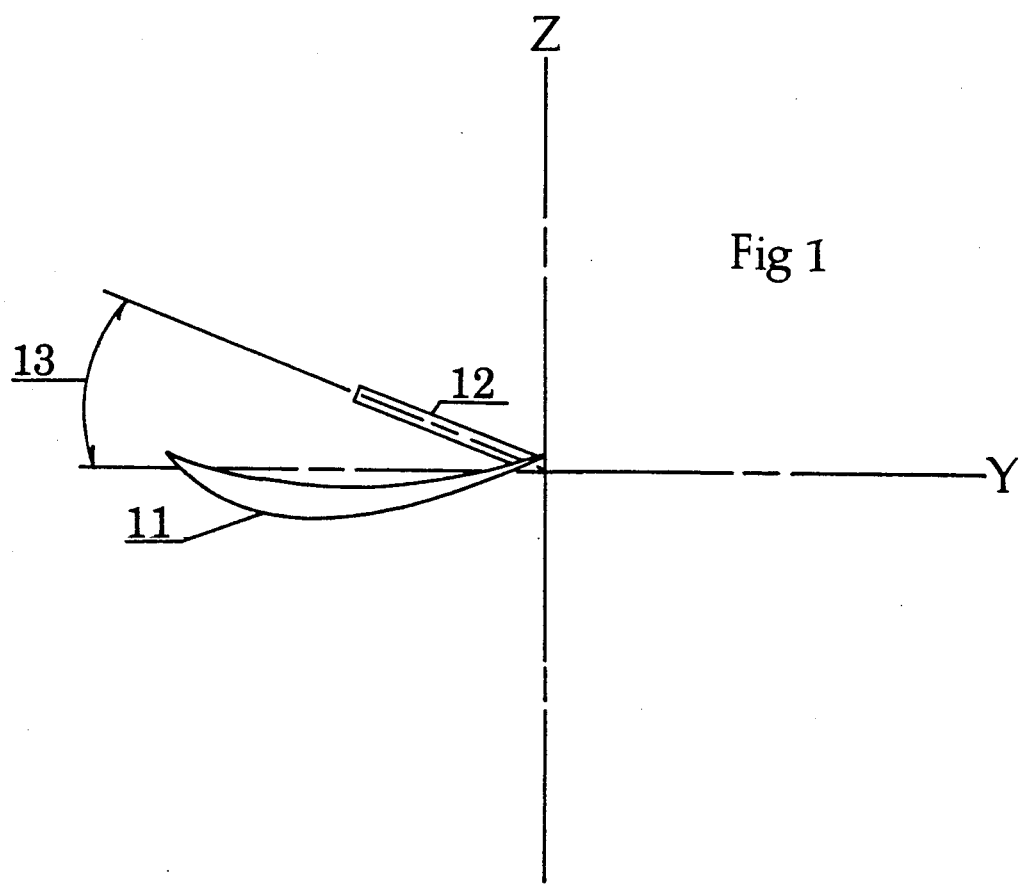
FIG. 1 is a diagram side view of one embodiment of the invention showing the upward angle of the bearing in relation to the base line of the blade in the Y-Z plane.
Figure 2:
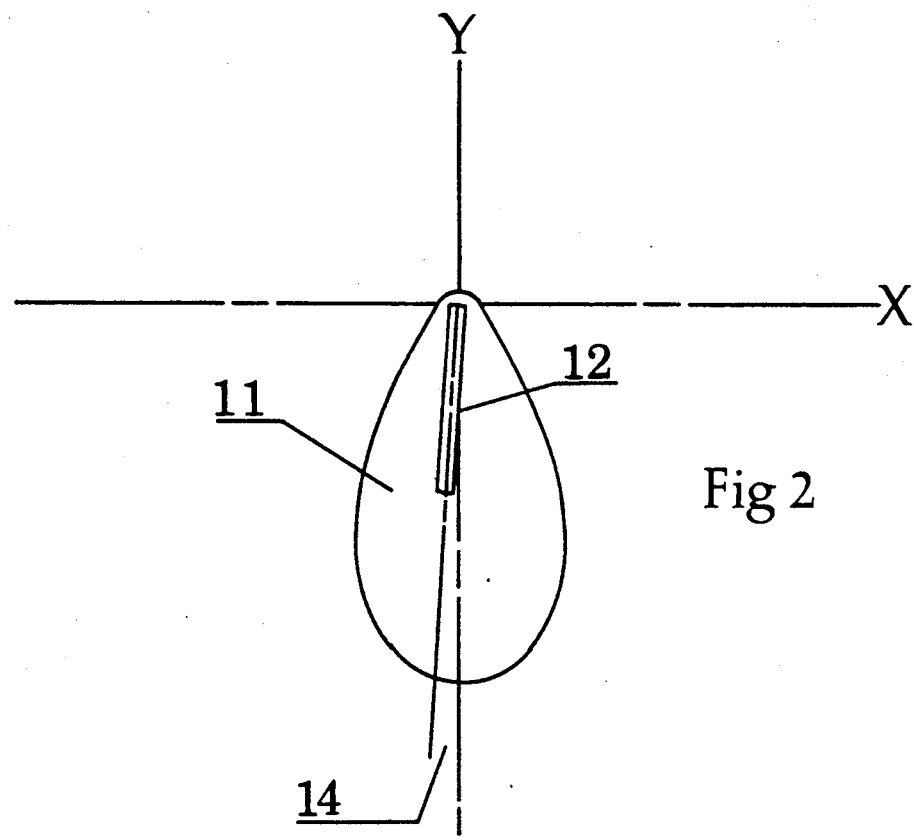
FIG. 2 is a diagram bottom view of one embodiment of the invention showing the offset angle of the bearing in relation to the blade in the X-Y plane.
Figure 4:
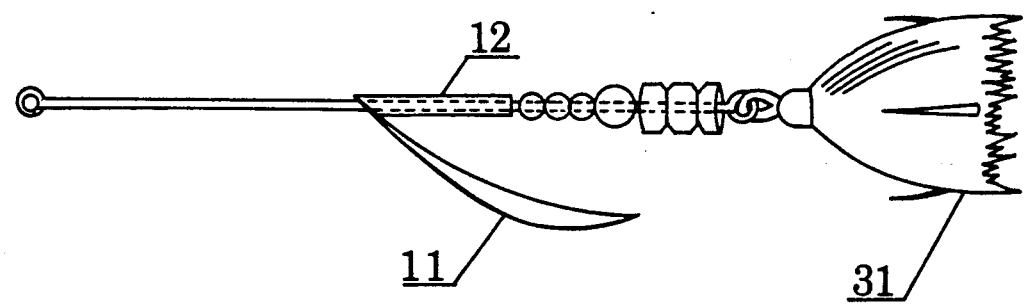
FIG. 4 is a side view showing the invention included as part of a different lure.
Figure 5:
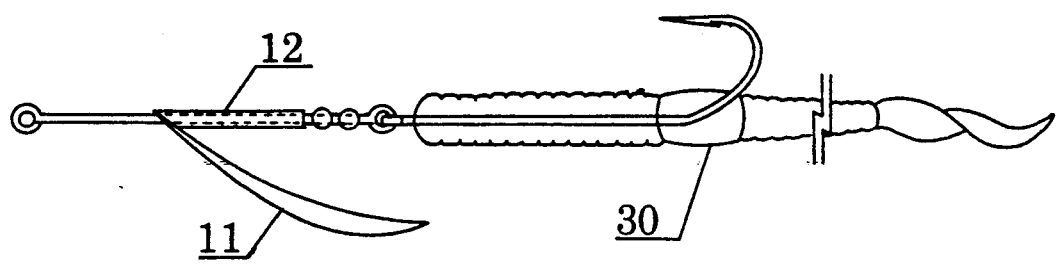
FIG. 5 is a side view showing the invention included as part of a different worm lure.
Figure 6:
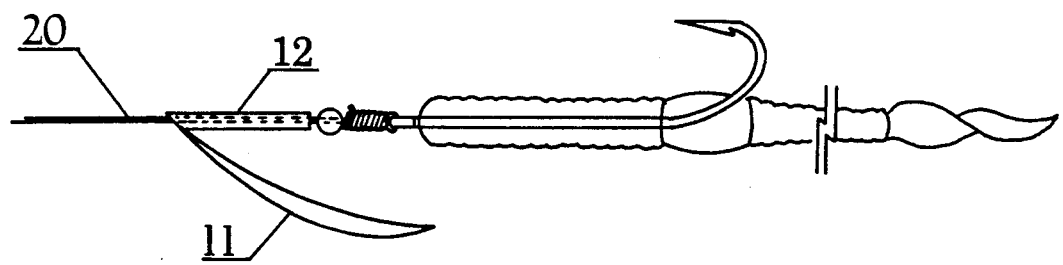
FIG. 6 is a side view showing the invention included as part of a fishing line and worm lure.

Referring to the drawings wherein like reference characters designate like or corresponding parts throughout the several views, and referring particularly to FIGS. 1 and 2, it is seen that the invention comprises a modified blade assembly 11, attached to a cylindrical bearing 12. The bearing 12 may be placed over a fishing line 20 (see FIG. 6), or be included as part of a typical fishing lure 30 or 31 (see FIGS. 4, and 5).

Figure 2A:
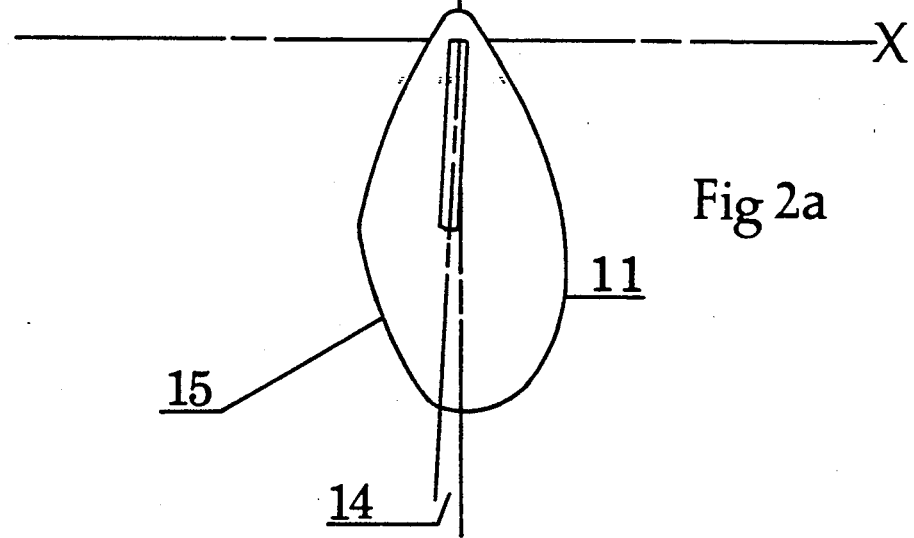
FIG. 2a is a diagram bottom view of another embodiment of the invention showing the offset angle of the bearing in relation to the blade in the X-Y plane.
Figure 3:
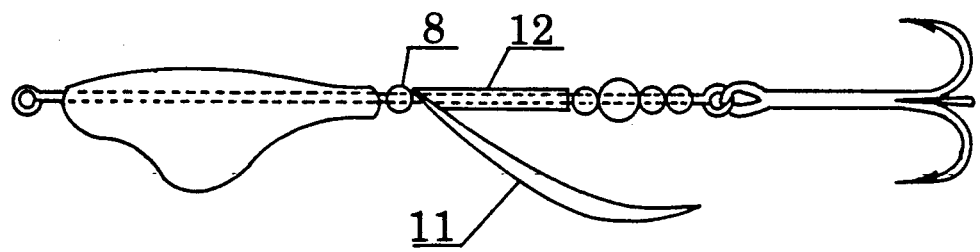
FIG. 3 is a side view showing the invention included as part of a typical lure having "weight forward" of the invention.

The blade 11 itself is attached to the bearing 12 at an upward angle 13 in the Y-Z plane as shown in FIG 1. Bearing 12 is offset in the X-Y plane at a shorter angle 14 as seen in FIG. 2 and FIG. 2a. The preferred embodiment of the blade is a modified tear-drop shape having a flattened edge 15 as shown in FIG. 2a.

Figure 7:
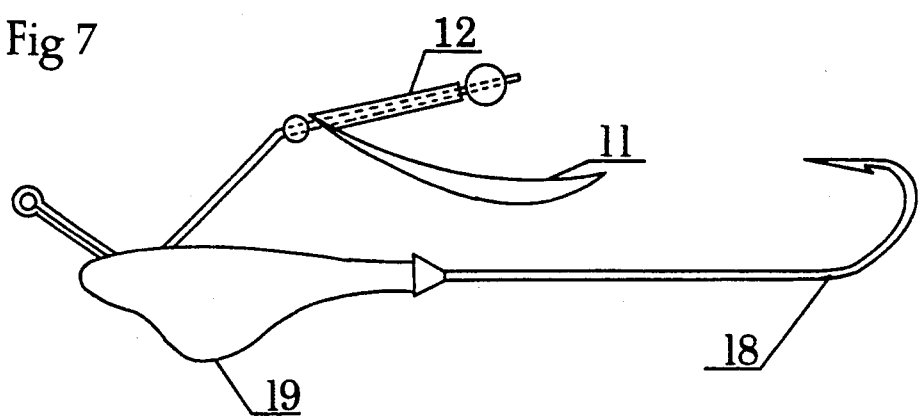
FIG. 7 is a side view of one embodiment of the invention included as part of a "weight forward" lure.
Figure 8:
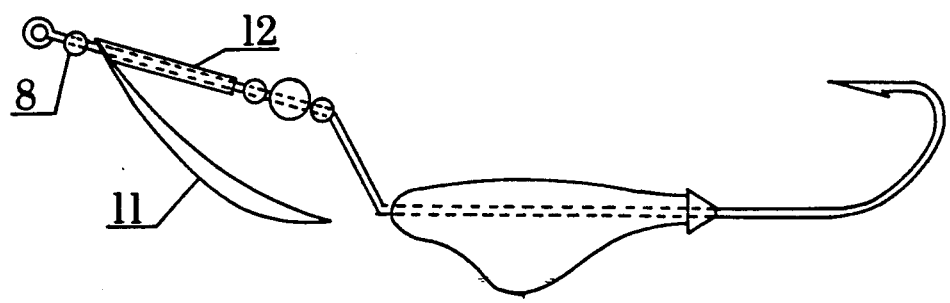
FIG. 8 is a side view showing the invention included as part of a different angled lure.

One embodiment of the invention includes the blade-and-bearing (11-12) assembly included as part of a lure which has a built-in weight located forward of the blade-and-bearing assembly (11-12) as shown in FIG. 7. In this embodiment, the weight 19 is placed forward of the blade-and-bearing assembly (11-12), and in line with the hook 18, and should be of greater mass than the weight of the hook and lure assembly itself so that the "forward" weight will lead the lure through the water as it falls after an initial cast.

In the preferred embodiment, the bearing-and-blade assembly (11-12) of the present invention may be constructed of either plastic, metal or a combination thereof (e.g. plastic blade 11 and metal bearing 12). The upward angle 13 of the blade from the bearing 12 in the Y-Z plane should be approximately 20°, with a range of between 10° and 30°. The bearing 12 itself is offset 14 in the Y-Z plane between approximately 4° and 10°. This particular 4°-10° range of offset 14 results in added rotation to the blade. If there were not such offset 14, the blade might not be inclined to spin at all, since all edges would come in contact with an equal amount of water. Furthermore, on one embodiment the blade 12 itself is a modified tear-drop shape (see FIG. 2a) such that a portion of the lower bowl 15 of the blade is flatter on one side than on the other. This flatness also results in additional impartation of spin.

We claim:

1. A rotatable blade for a fishing lure comprising a blade attached to a hollow bearing assembly, said blade having a bowl shape along a base line defining an interior concave surface and an exterior convex surface, said blade having a teardrop form with a point at one end of the base line and a bowl at the other end of the base line, the bearing being attached on the concave surface of the blade near the pointed end of the teardrop wherein said bearing is upwardly offset from the base line of the blade in the Y-Z plane at an angle of between 10° to 30°.

2. The invention described in claim 1 wherein the bearing is laterally offset from the base line of the blade in the X-Y plane at an angle of between 4° and 10°.

3. The invention described in claim 2 wherein the teardrop shape of said blade is modified so that the edge of the bowl is flatter along the outside edge on one side than the outside edge on the other side.

4. The invention described in claim 3 wherein the blade-and-bearing assembly is attached to a lure having a weight forward of the teardrop point of the blade.

5. The invention described in claim 2 wherein the blade-and-bearing assembly is attached to a lure having a weight forward of the teardrop point of the blade.

6. The invention described in claim 4 wherein the bearing-and-blade assembly is attached to a lure.

7. The invention described in claim 2 wherein the blade-and-bearing assembly is attached to a lure.

8. The invention described in claim 3 wherein the blade-and-bearing assembly is attached to a lure.

9. The invention described in claim 1 wherein a fishing line is passed through the bearing.

10. The invention described in claim 2 wherein a fishing line is passed through the bearing.

11. The invention described in claim 3 wherein a fishing line is passed through the bearing.

* * * * *